(12) United States Patent
Lee et al.

(10) Patent No.: US 11,860,472 B2
(45) Date of Patent: Jan. 2, 2024

(54) SOLVENT-FREE PHOTO-CURABLE RESIN COMPOSITION FOR POLARIZING PLATE PROTECTIVE LAYER, POLARIZING PLATE COMPRISING CURED PRODUCT THEREOF, AND IMAGE DISPLAY DEVICE

(71) Applicant: SHANJIN OPTOELECTRONICS (SUZHOU) CO., LTD., Zhangjiagang (CN)

(72) Inventors: Mi So Lee, Daejeon (KR); Yoonkyung Kwon, Daejeon (KR); Sanghun Han, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 498 days.

(21) Appl. No.: 16/646,029

(22) PCT Filed: Sep. 20, 2018

(86) PCT No.: PCT/KR2018/011188
§ 371 (c)(1),
(2) Date: Mar. 10, 2020

(87) PCT Pub. No.: WO2019/059693
PCT Pub. Date: Mar. 28, 2019

(65) Prior Publication Data
US 2020/0292876 A1   Sep. 17, 2020

(30) Foreign Application Priority Data

Sep. 22, 2017   (KR) ........................ 10-2017-0122715

(51) Int. Cl.
*G02F 1/1335*   (2006.01)
*C08F 2/50*   (2006.01)
(Continued)

(52) U.S. Cl.
CPC .......... *G02F 1/133528* (2013.01); *C08F 2/50* (2013.01); *C08F 20/18* (2013.01);
(Continued)

(58) Field of Classification Search
CPC ............... C02F 1/133528; C08F 20/18; C08G 18/8175; C08G 18/10; G02B 5/30;
(Continued)

(56) References Cited

U.S. PATENT DOCUMENTS

2003/0113639 A1   6/2003   Kawase
2004/0218117 A1   11/2004   Matsuoka et al.
(Continued)

FOREIGN PATENT DOCUMENTS

JP   2000230016 A   8/2000
JP   2001151814 A   6/2001
(Continued)

OTHER PUBLICATIONS

Supplemental European Search Report for Application No. 18858495.7 dated Sep. 21, 2020, 2 pages.
(Continued)

*Primary Examiner* — Ruiyun Zhang
(74) *Attorney, Agent, or Firm* — Schmeiser, Olsen & Watts, LLP

(57) ABSTRACT

A solvent free-type photocurable resin composition for a polarizing plate protective layer includes an acryl-based prepolymer comprising a (meth)acrylate-based monomer as a polymerization unit; and an isocyanate-based crosslinking agent, wherein the acryl-based prepolymer is in a partially polymerized state, and viscosity at 25° C. is greater than or equal to 50 cPs and less than or equal to 300 cPs. A polarizing plate including the solvent free-type photocurable resin composition, and an image display device including the polarizing plate is also provided.

9 Claims, 4 Drawing Sheets

(51) Int. Cl.
  *C08F 20/18* (2006.01)
  *C08G 18/81* (2006.01)
  *G02B 5/30* (2006.01)
  *C08G 18/10* (2006.01)
  *C08K 3/013* (2018.01)
  *C08K 5/00* (2006.01)
  *G02F 1/1334* (2006.01)

(52) U.S. Cl.
  CPC ......... *C08G 18/10* (2013.01); *C08G 18/8175* (2013.01); *G02B 5/30* (2013.01); *G02B 5/3016* (2013.01); *C08K 3/013* (2018.01); *C08K 5/005* (2013.01); *C08K 5/0016* (2013.01); *C09K 2323/03* (2020.08); *C09K 2323/031* (2020.08); *C09K 2323/035* (2020.08); *C09K 2323/05* (2020.08); *C09K 2323/057* (2020.08); *G02F 1/1334* (2013.01)

(58) Field of Classification Search
  CPC .............. G02B 5/3016; C09K 2323/03; C09K 2323/031; C09K 2323/035; C09K 2323/05; C09K 2323/057
  USPC .......................... 428/1.3, 131, 1.33, 1.5, 1.54
  See application file for complete search history.

(56) References Cited

U.S. PATENT DOCUMENTS

| 2007/0269616 | A1 | 11/2007 | Nakano et al. | |
| 2010/0238383 | A1 | 9/2010 | Nakano et al. | |
| 2015/0043069 | A1 | 2/2015 | Lee et al. | |
| 2019/0077134 | A1* | 3/2019 | Konno | B32B 25/06 |
| 2020/0123422 | A1* | 4/2020 | Fukuda | H01B 1/02 |

FOREIGN PATENT DOCUMENTS

| JP | 2002120326 A | 4/2002 |
| JP | 2003185824 A | 7/2003 |
| JP | 2004245924 A | 9/2004 |
| JP | 2010107951 A | 5/2010 |
| JP | 2013256552 A | 12/2013 |
| JP | 2014010311 A | 1/2014 |
| JP | 5501659 B2 | 5/2014 |
| JP | 2015110763 A | 6/2015 |
| KR | 20070111352 A | 11/2007 |
| KR | 20080080528 A | 9/2008 |
| KR | 20090115040 A | 11/2009 |
| KR | 20130099422 A | 9/2013 |
| KR | 20150018295 A | 2/2015 |
| KR | 20150094664 A | 8/2015 |
| KR | 101613761 B1 | 4/2016 |
| KR | 20160096403 A | 8/2016 |
| KR | 20160117870 A | 10/2016 |

OTHER PUBLICATIONS

PCT International Search Report dated Feb. 28, 2019 corresponding to PCT International Application No. PCT/KR2018/011188, English Translation.

* cited by examiner

[FIG. 1]
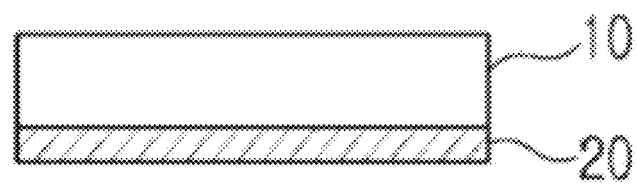
[FIG. 2]
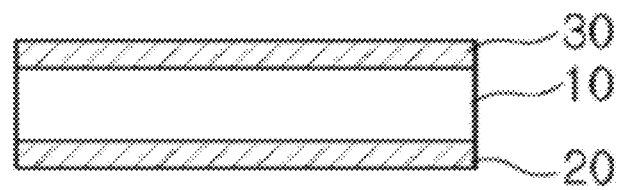
[FIG. 3]
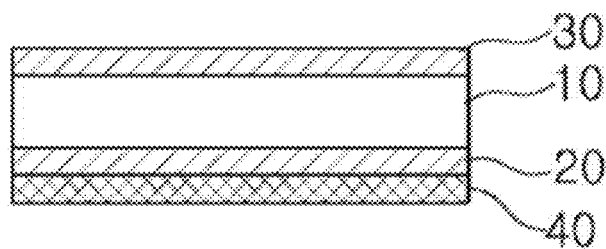

[FIG. 4]
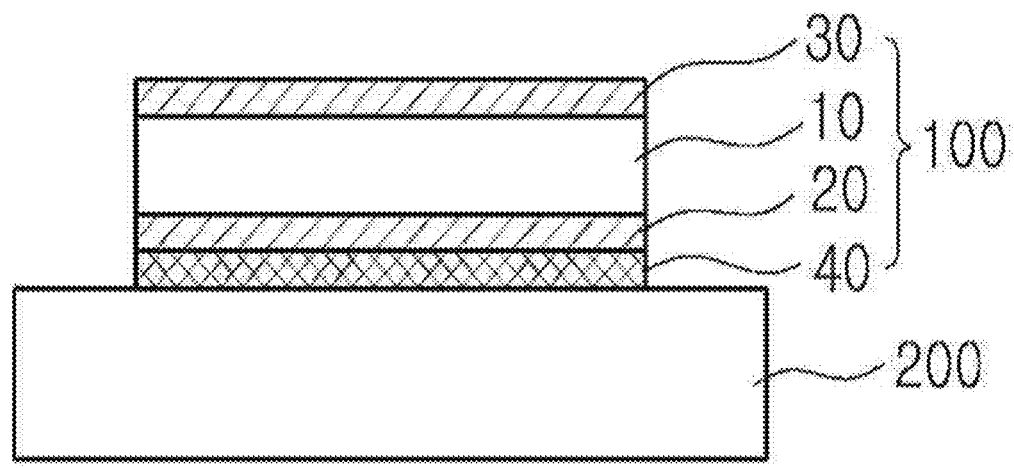

[FIG. 5]

| Category | Evaluation on high temperature Facilitation (Crack Occurrences %) |
|---|---|
| Comparative Example 1 | 100% |
| Example 2 | 28% |
| Example 3 | Less than 3% |

[FIG. 6]
<Appearance Image After High Temperature Water Resisting>
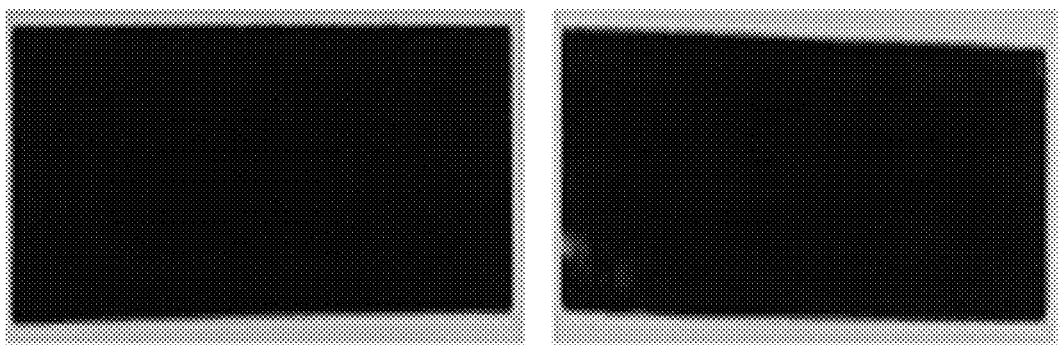
Example 1                Comparative Example 1
[FIG. 7]
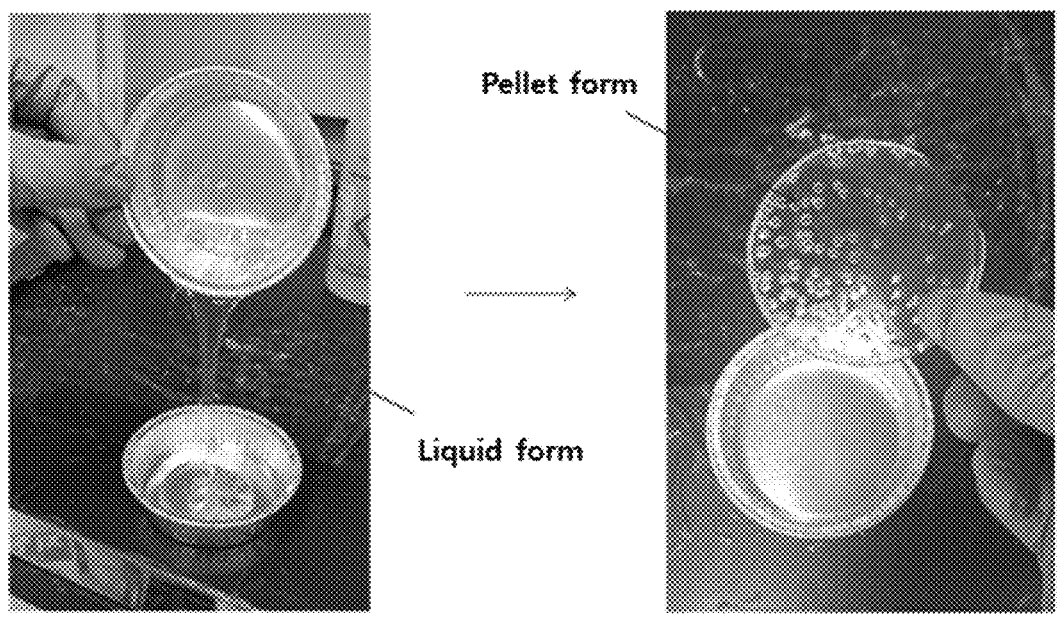
Composition state  
(solid content 33%)
State after volatilizing solvent  
(solid content 100%)

US 11,860,472 B2

SOLVENT-FREE PHOTO-CURABLE RESIN COMPOSITION FOR POLARIZING PLATE PROTECTIVE LAYER, POLARIZING PLATE COMPRISING CURED PRODUCT THEREOF, AND IMAGE DISPLAY DEVICE

CROSS REFERENCE TO RELATED APPLICATIONS

The present application is a national stage entry under 35 U.S.C. § 371 of International Application No. PCT/KR2018/011188 filed on Sep. 20, 2018, which claims priority to Korean Patent Application No. 10-2017-0122715, filed with the Korean Intellectual Property Office on Sep. 22, 2017, the entire contents of which are incorporated herein by reference.

TECHNICAL FIELD

The present specification relates to a solvent free-type photocurable resin composition for a polarizing plate protective layer, a polarizing plate comprising a cured material thereof, and an image display device.

BACKGROUND ART

Existing polarizing plates for a liquid crystal display device uses a general polyvinyl alcohol-based polarizer, and have a constitution of attaching a protective film such as TAC on at least one side surface of the polarizer.

In a recent polarizing plate market, demands for low light leakage and thinning have increased, and in order to satisfy these properties, a method of directly forming a protective film on a polarizer has been examined instead of using an existing protective base formed as a film in advance.

However, when directly forming a protective film on an existing polyvinyl alcohol-based elongation-type polyvinyl alcohol-based polarizer, a problem of the polarizer being torn by stress generated from polarizer shrinkage at a high temperature has been difficult to resolve compared to when using a protective base on both surfaces as in the art.

DISCLOSURE

Technical Problem

Existing polarizing plates for a liquid crystal display device generally uses a polyvinyl alcohol-based polarizer, and have a constitution of attaching a protective film such as TAC on at least one side surface of the polarizer.

In a recent polarizing plate market, demands for low light leakage and thinning have increased, and in order to satisfy these properties, a method of directly forming a protective film on a polarizer has been examined instead of using an existing protective base formed as a film in advance.

However, when directly forming a protective film on one surface of a polarizer as above, a problem of the polarizer being torn by stress generated from polarizer shrinkage has been difficult to resolve.

The present specification is directed to providing a solvent free-type photocurable resin composition for a polarizing plate protective layer capable of resolving such a problem.

Problems that the present specification tries to resolve are not limited to the problems mentioned above, and other technical problems that are not mentioned will be clearly understood to those skilled in the art from the following descriptions.

Technical Solution

One embodiment of the present specification provides a solvent free-type photocurable resin composition for a polarizing plate protective layer comprising an acryl-based prepolymer comprising a (meth)acrylate-based monomer as a polymerization unit; and an isocyanate-based crosslinking agent, wherein the acryl-based prepolymer is in a partially polymerized state, and viscosity at 25° C. is greater than or equal to 50 cPs and less than or equal to 300 cPs.

Another embodiment of the present specification provides a polarizing plate comprising a polarizer; and a protective layer provided on one surface or both surfaces of the polarizer, wherein the protective layer is a cured material of the solvent free-type photocurable resin composition for a polarizing plate protective layer described above.

Still another embodiment of the present specification provides an image display device comprising the polarizing plate described above.

Advantageous Effects

A solvent free-type photocurable resin composition for a polarizing plate protective layer according to one embodiment of the present specification has advantages of having superior appearance and excellent strength under a high temperature environment when coated on one surface or both surfaces of a polarizer.

In addition, the solvent free-type photocurable resin composition for a polarizing plate protective layer is effective in significantly improving transparency, flexibility and gel fraction, and is effective in improving high temperature durability when used in a polarizing plate by significantly improving fracture roughness.

Furthermore, there are advantages in that shrinkage does not significantly occur when curing, which is effective in maintaining excellent appearance of the polarizing plate when manufacturing the polarizing plate, and there is not much odor.

The polarizing plate according to one embodiment of the present specification comprises a protective layer on one surface or both surfaces of a polarizer without using an adhesive, and therefore, a polarizing plate having less curing shrinkage in a protective coating layer forming step while having a small thickness is provided.

DESCRIPTION OF DRAWINGS

FIG. 1 to FIG. 3 illustrate structures of a polarizing plate according to one embodiment of the present specification.

FIG. 4 illustrates a structure of an image display device according to one embodiment of the present specification.

FIG. 5 shows an appearance image after evaluating high temperature facilitation of a polarizing plate according to one embodiment of the present specification.

FIG. 6 shows an appearance image after evaluating high temperature water resistance of a polarizing plate according to one embodiment of the present specification.

FIG. 7 shows results of Experimental Example 3.

REFERENCE NUMERAL

10: Polarizer
20: Protective Layer
30: Protective Film
40: Gluing Layer 100: Polarizing Plate
200: Liquid Crystal Panel

MODE FOR DISCLOSURE

Hereinafter, the present specification will be described in detail.

In the present specification, a description of a certain member being placed "on" another member comprises not only a case of the one member adjoining the other member but a case of still another member being present between the two members.

In the present specification, a description of a certain part "comprising" certain constituents means capable of further comprising other constituents, and does not exclude other constituents unless particularly stated on the contrary.

Solvent Free-Type Photocurable Resin Composition for Polarizing Plate Protective Layer One embodiment of the present specification provides a solvent free-type photocurable resin composition for a polarizing plate protective layer comprising an acryl-based prepolymer comprising a (meth)acrylate-based monomer as a polymerization unit; and an isocyanate-based crosslinking agent, wherein the acryl-based prepolymer is in a partially polymerized state, and viscosity at 25° C. is greater than or equal to 50 cPs and less than or equal to 300 cPs. By the solvent free-type photocurable resin composition for a polarizing plate protective layer comprising an acryl-based prepolymer comprising a (meth)acrylate-based monomer as a polymerization unit, there is an advantage in that composition viscosity may be readily controlled. Specifically, when a (meth)acrylate-based monomer is simply mixed rather than being partially polymerized in the acryl-based prepolymer, viscosity of the composition is 10 cPs or less causing a problem of viscosity being too low (Preparation Examples 4 to 6). In addition, when completely polymerizing the (meth)acrylate-based monomer, viscosity of the composition is too high causing a problem of reducing coatability. In the present specification, the viscosity range of the composition is controlled to be in a specific range by adjusting the degree of polymerization of the (meth)acrylate-based monomer. Through this, coatability of the composition for a polarizer is improved.

In the present specification, the "polymerization unit" of a certain monomer or compound means a form of the monomer or compound being included in a polymer as a monomer unit through a polymerization reaction.

In the present specification, the "solvent free-type" composition is distinguished from a solvent-type composition, and means the composition not comprising a solvent such as an organic solvent or an aqueous solvent. Since the composition does not comprise a solvent, coating efficiency on a polarizer may be enhanced, and a uniform coating layer with substantially no variations in the thickness may be prepared. In addition, by excluding a solvent, bubble generations or a decrease in the leveling caused by a solvent volatilization process and the like may be prevented, and a film that is uniform while being thick may be effectively prepared. In addition, no contamination is caused during a process since a solvent volatilization process is not required.

In the present specification, the solvent free-type photocurable resin composition for a polarizing plate protective layer may be used when forming a polarizing plate protective layer. The polarizing plate protective layer is formed on any one surface or both surfaces of a polarizer, and is formed directly adjoining the any one surface or both surfaces of the polarizer without providing an adhesive layer in between.

In the present specification, the solvent free-type photocurable resin composition for a polarizing plate protective layer comprises an acryl-based prepolymer comprising the (meth)acrylate-based monomer as a polymerization unit. The "prepolymer" means a polymer in an intermediate state with which a polymerization reaction may proceed faster. In addition, the acryl-based prepolymer may have a photoreactive group on the side chain or at the end.

In the present specification, the "prepolymer" is mixture comprising a "bulk polymerized prepolymer" and "unpolymerized (meth)acrylate-based monomer". Herein, the bulk polymerized prepolymer may have a photoreactive group on the side chain or at the end. By adjusting a content ratio of the prepolymer and the unpolymerized (meth)acrylate-based monomer during the polymerization reaction, an advantage of readily controlling a molecular weight and viscosity of the partially polymerized prepolymer is obtained.

In the present specification, the "polymer component" is a collective term for high molecular weight components comprising two or more monomers in a polymerized form. For example, the polymer component may mean a component such as an oligomer or a polymer. In addition, the polymer component also comprises a state of a monomer being partially polymerized, and may be understood to comprise an unreacted monomer component as well.

In the present specification, the "monomer" means a unit compound in which a compound may be converted to a polymer compound by a polymerization reaction.

In the present specification, the "oligomer" means a low molecular weight polymer having a relatively small repetition unit, and means a polymer having tens to thousands of repetition units with a weight average molecular weight of 40,000 or less, a number average molecular weight of 15,000 or less, or a viscosity average molecular weight of 15,000 or less.

In the present specification, the "polymer" is a compound having a higher molecular weight than the oligomer, and means a compound formed by polymerizing a number of monomers or oligomers.

In the present specification, the "photocurable resin composition" means a composition cured by irradiation of light (light irradiation).

In the present specification, the "light irradiation" means irradiation of electromagnetic waves that may induce a polymerization reaction by affecting a photoinitiator or a polymerizable compound. The electromagnetic waves may comprise microwaves, infrared rays, ultraviolet rays, x-rays, gamma rays and the like.

In the present specification, the "photoreactive group" is a collective term for functional groups capable of inducing a polymerization or crosslinking reaction by the irradiation of electromagnetic waves.

In the present specification, the "electromagnetic waves" is a collective term for particle beams such as microwaves, infrared rays, x-rays, gamma rays, alpha particle rays, proton beams, neutron beams and electron beams, and for example, may comprise ultraviolet rays. By comprising a polymer component having a photoreactive group, the composition according to one embodiment of the present specification may be formed with a photocurable composition.

In the present specification, the "reactive monomer" is a monomer copolymerizable with the (meth)acrylate-based monomer, and may mean a monomer capable of providing a reactive group on the side chain or at the end of the polymer after polymerization. In other words, the "reactive monomer" is a polar monomer copolymerizable with the (meth)acrylate-based monomer.

In the present specification, the "glass transition temperature" means a temperature causing a glass transition.

In one embodiment of the present specification, the "acryl-based prepolymer" may be formed by bulk-polymerization, particularly, in the manner of partial polymerization by bulk-polymerization. In other words, some of the monomers included in the bulk-polymerization may remain as an unreacted monomer. For example, the acryl-based prepolymer may comprise a partial polymer of a monomer mixture comprising a (meth)acrylate-based monomer and a reactive monomer; and a compound providing a photoreactive group while forming a bond with the reactive group in the partial polymer.

In one embodiment of the present specification, the acryl-based prepolymer may be a partial polymer of a monomer mixture comprising a (meth)acrylate-based monomer and a reactive monomer. Specifically, the acryl-based prepolymer may comprise a (meth)acrylate-based monomer and a reactive monomer.

In one embodiment of the present specification, the acryl-based prepolymer comprises an acryl-based prepolymer comprising a (meth)acrylate-based monomer as a polymerization unit; and a monomer mixture, and the monomer mixture may comprise a (meth)acrylate-based monomer and a reactive monomer.

When partial polymerizing the monomer mixture comprising a (meth)acrylate-based monomer and a reactive monomer, some monomers included in the monomer mixture are polymerized to form a polymer component, and other monomers may be included as a monomer component in the composition.

In one embodiment of the present specification, the acryl-based prepolymer may be a partial polymerized resin.

In one embodiment of the present specification, types of the (meth)acrylate-based monomer included in the monomer mixture are not particularly limited, and may preferably be an alkyl (meth)acrylic acid ester monomer.

In one embodiment of the present specification, examples of the alkyl (meth)acrylic acid ester monomer may comprise one, two or more types of alkyl (meth)acrylates having an alkyl group with 1 to 14 carbon atoms such as methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylbutyl (meth) acrylate, 2-ethylhexyl (meth) acrylate, n-octyl (meth)acrylate, isooctyl (meth)acrylate, isononyl (meth)acrylate, lauryl (meth)acrylate and tetradecyl (meth)acrylate. In addition, monomers having a high glass transition temperature such as iso-bornyl acrylate may also be included as the (meth)acrylate-based monomer.

In one embodiment of the present specification, examples of the reactive monomer may comprise monomers having one or more functional groups selected from the group consisting of a hydroxyl group, a carboxyl group, an isocyanate group, an amino group and an epoxy group, and may preferably comprise monomers having a hydroxyl group or a carboxyl group, however, the reactive monomer is not limited thereto.

In one embodiment of the present specification, as the reactive monomer having a hydroxyl group, 2-hydroxyethyl (meth)acrylate, 2-hydroxypropyl (meth)acrylate, 4-hydroxybutyl (meth) acrylate, 6-hydroxyhexyl (meth) acrylate, 8-hydroxyoctyl (meth)acrylate, 2-hydroxyethylene glycol (meth)acrylate, 2-hydroxypropylene glycol (meth)acrylate or the like may be used, and as a copolymerizable monomer having a carboxyl group as a reactive group, (meth)acrylic acid, 2-(meth)acryloyloxy acetic acid, 3-(meth)acryloyloxy propyl acid, 4-(meth)acryloyloxy butyl acid, acrylic acid dimers, itaconic acid, maleic acid, maleic anhydride or the like may be included.

In one embodiment of the present specification, the monomer mixture may comprise the (meth)acrylate-based monomer in 70 parts by weight to 99 parts by weight and the reactive monomer in 1 parts by weight to 30 parts by weight based on 100 parts by weight of the monomer mixture, and may preferably comprise the (meth)acrylate-based monomer in 90 parts by weight to 99 parts by weight and the reactive monomer in 1 parts by weight to 10 parts by weight. When satisfying the above-mentioned numerical range, the composition viscosity may be adjusted to be suitable enough for coating.

In the present specification, the unit "parts by weight" means a weight ratio. When a weight ratio between the monomers is in the above-mentioned range, the composition curability is excellently maintained, and a decrease in the transparency of the composition or a cured material thereof caused by phase separation and the like in the composition may be prevented.

In one embodiment of the present specification, the monomer mixture may further comprise a functional monomer in addition to the above-described monomer.

In one embodiment of the present specification, when partial polymerizing such a monomer mixture, a degree of partial polymerization is not particularly limited, and may be adjusted depending on the purpose. For example, the degree of partial polymerization may be controlled within a range for the composition to satisfy a viscosity range to describe later.

In one embodiment of the present specification, the solvent free-type photocurable resin composition for a polarizing plate protective layer comprises an isocyanate-based crosslinking agent. When the solvent free-type photocurable resin composition for a polarizing plate protective layer further comprises a crosslinking agent, chemical bonding between the composition and a polarizer is induced leading to an advantage of obtaining excellent adhesion between the protective layer and the polarizer under a high temperature and high humidity environment.

In one embodiment of the present specification, the isocyanate-based crosslinking agent may comprise one, two or more types of (meth)acrylate, 1,1-bis(acryloyloxymethyl) ethyl isocyanate, (meth) acryloyloxyethyl isocyanate, meta-isopropenyl-α,α-dimethylbenzyl isocyanate, methacryloyl isocyanate; vinyl isocyanate; allyl isocyanate; an acryloyl monoisocyanate compound obtained by reacting a diisocyanate compound or polyisocyanate compound with (meth) acrylic acid 2-hydroxyethyl; an acryloyl monoisocyanate compound obtained by reacting a diisocyanate compound, polyisocyanate compound or a polyol compound and (meth) acrylic acid 2-hydroxyethyl; (meth)acrylic acid glycidyl; (meth)acrylic acid; or 3-methacryloxypropyl dimethylchlorosilane, but is not limited thereto. The isocyanate-based crosslinking agent comprises an isocyanate functional group, and may form a urethane bond with a hydroxyl group (—OH) of a polarizer, and as a result, an effect of excellent adhesion between the polarizer and the protective layer under a high temperature and high humidity environment is obtained.

In one embodiment of the present specification, preferred examples of the isocyanate-based crosslinking agent may comprise an isocyanate-based crosslinking agent having an isocyanate (—NCO) functional group and an acrylate functional group at the same time. For example, 2-isocyanatoethyl (meth)acrylate (AOI) may be included. The isocyanate-based crosslinking agent comprises an acrylate functional group enabling a protective layer to be cured by light irradiation, and therefore, an advantage of significantly improving economic feasibility of the process may be obtained.

In one embodiment of the present specification, the isocyanate-based crosslinking agent may be included in 5 parts by weight to 30 parts by weight with respect to 100 parts by weight of the acryl-based prepolymer, and may preferably be included in 10 parts by weight to 20 parts by weight with respect to 100 parts by weight of the acryl-based prepolymer. When the isocyanate-based crosslinking agent is included in parts by weight of the above-mentioned numerical range, cohesion of the cured material is properly controlled, and advantages of enhancing adhesion reliability, excellent flowability, and excellent adhesive strength for a polarizer are obtained.

In one embodiment of the present specification, the solvent free-type photocurable resin composition for a polarizing plate protective layer may further comprise a photoinitiator.

Examples of the photoinitiator may comprise alpha-hydroxyketone-based compounds (ex. IRGACURE 184, IRGACURE 500, IRGACURE 2959, DAROCUR 1173; Ciba Specialty Chemicals (manufacturer)); phenylglyoxylate-based compounds (ex. IRGACURE 754, DAROCUR MBF; Ciba Specialty Chemicals (manufacturer)); benzyl dimethyl ketal-based compounds (ex. IRGACURE 651; Ciba Specialty Chemicals (manufacturer)); α-aminoketone-based compounds (ex. IRGACURE 369, IRGACURE 907, IRGACURE 1300; Ciba Specialty Chemicals (manufacturer)); monoacyl phosphine-based compounds (MAPO) (ex. DAROCUR TPO; Ciba Specialty Chemicals (manufacturer)); bisacyl phosphine-based compounds (BAPO) (ex. IRGACURE 819, IRGACURE 819DW; Ciba Specialty Chemicals (manufacturer)); phosphine oxide-based compounds (ex. IRGACURE 2100; Ciba Specialty Chemicals (manufacturer)); metallocene-based compounds (ex. IRGACURE 784; Ciba Specialty Chemicals (manufacturer)); iodonium salts (ex. IRGACURE 250; Ciba Specialty Chemicals (manufacturer)); mixtures of one or more thereof (ex. DAROCUR 4265, IRGACURE 2022, IRGACURE 1300, IRGACURE 2005, IRGACURE 2010, IRGACURE 2020; Ciba Specialty Chemicals (manufacturer)) and the like. One, or two or more types thereof may be used in the present specification, however, the use is not limited thereto.

In one embodiment of the present specification, the photoinitiator may be included in 0.01 parts by weight to 5 parts by weight with respect to 100 parts by weight of the acryl-based prepolymer. When the photoinitiator is included in the content of the above-mentioned numerical range, ultraviolet rays reach into a protective layer, the rate of polymerization is excellent, and a decrease in the molecular weight of the produced polymer may be prevented. As a result, advantages of excellent cohesion of a formed protective layer, and excellent adhesive strength for a polarizer are obtained.

In one embodiment of the present specification, the solvent free-type photocurable resin composition may further comprise one or more additives selected from the group consisting of a dye, a pigment, an epoxy resin, an ultraviolet stabilizer, an antioxidant, a colorant, a reinforcing agent, a filler, a defoamer, a surfactant, a photoviscosity agent and a plasticizer.

In one embodiment of the present specification, the acryl-based prepolymer has a molecular weight of greater than or equal to 300,000 and less than or equal to 2,000,000, preferably greater than or equal to 300,000 and less than or equal to 1,000,000, and more preferably greater than or equal to 300,000 and less than or equal to 500,000. Satisfying the above-mentioned range is effective in having a high conversion rate during a photocuring reaction, and an advantage of increasing a curing rate is obtained due to the high conversion rate.

In one embodiment of the present specification, the acryl-based prepolymer has a weight average molecular weight (Mw) of 300,000 to 2,000,000 or less. The weight average molecular weight (Mw) means an average molecular weight relating to molecular weight distribution, and may be obtained through conversion using a gel permeation chromatography (GPC) method.

In one embodiment of the present specification, the acryl-based prepolymer has a number average molecular weight (Mn) of 100,000 to 1,000,000 or less. The number average molecular weight (Mn) is an average molecular weight obtained by averaging molecular weights of component molecular species of a polymer compound having molecular weight distribution by a number fraction or a mole fraction, and may be measured by a membrane osmotic pressure method.

In one embodiment of the present specification, the acryl-based prepolymer has a molecular weight distribution index (PDI) of greater than or equal to 2 and less than or equal to 10, and preferably greater than or equal to 3 and less than or equal to 5. The molecular weight distribution index (PDI) is a concept representing molecular weight distribution in a polymer material, and means a ratio of a weight average molecular weight with respect to a number average molecular weight. This value being closer to 1 means the distribution being smaller.

In one embodiment of the present specification, the acryl-based prepolymer has viscosity of greater than or equal to 50 cPs and less than or equal to 500 cPs, preferably greater than or equal to 100 cPs and less than or equal to 450 cPs, and more preferably greater than or equal to 200 cPs and less than or equal to 450 cPs at 25° C. When the viscosity at 25° C. satisfies the above-mentioned range, a coating layer with a uniform thickness is readily formed on a polarizer, and when performing a process coating a composition comprising the acryl-based prepolymer, the composition is uniformly coated on the polarizer without a separate additional process making the process simple.

The "viscosity" in the present specification may be measured using common methods used in the art. For example, the viscosity may be measured for 5 minutes at room temperature (25° C.) and in a No. 18 spindle using a Brookfield viscometer. Herein, the amount of the measured prepolymer or composition may be greater than or equal to 6.5 mL and less than or equal to 10 mL.

In one embodiment of the present specification, the solvent free-type photocurable resin composition for a polarizing plate protective layer has viscosity of greater than or equal to 50 cPs and less than or equal to 300 cPs, preferably greater than or equal to 50 cPs and less than or equal to 250 cPs, and more preferably greater than or equal to 50 cPs and less than or equal to 200 cPs. When satisfying the above-mentioned numerical range, there are advantages in that adhesive strength of the composition for a polarizer is high since the composition cohesion is properly controlled, and a protective layer may be uniformly formed since coatability for the polarizer is excellent.

In the present specification, when partial polymerizing such a monomer mixture, the degree of partial polymerization may be expressed as a "degree of polymerization of prepolymer". The degree of polymerization means a weight ratio of the monomer polymerized to a polymer among the monomers used in the polymerization reaction.

In one embodiment of the present specification, the acryl-based prepolymer has a degree of polymerization of greater than or equal to 5% and less than or equal to 20%, preferably greater than or equal to 5% and less than or equal to 15%, and more preferably greater than or equal to 5% and less than or equal to 10%. When satisfying the above-mentioned numerical range, the composition viscosity is maintained in a proper range, and advantages of excellent coatability and high processability are obtained. In addition, the glass transition temperature may be maintained high, and an advantage of forming a polarizing plate protective layer having excellent water resistance and durability under a high temperature condition may be obtained.

In the present specification, the degree of polymerization of the acryl-based prepolymer means a solid weight of a polymerized (meth)acrylate monomer with respect to a solid weight of a total unpolymerized (meth)acrylate monomer.

In one embodiment of the present specification, the solvent free-type photocurable resin composition for a polarizing plate protective layer may have a solid content of 99.7% or higher, preferably 99.8% or higher, and more preferably 99.9% or higher.

In one embodiment of the present specification, the acryl-based prepolymer has a glass transition temperature of higher than or equal to 80° C. and lower than or equal to 100° C., preferably higher than or equal to 80° C. and lower than or equal to 95° C., and more preferably higher than or equal to 80° C. and lower than or equal to 90° C. The solvent free-type photocurable resin composition according to one embodiment of the present specification is an acryl-based prepolymer, and readily adheres with a polarizer by using a (meth)acrylate-based monomer having a high glass transition temperature, and using a reactive monomer. When the acryl-based prepolymer has a high glass transition temperature, the solvent free-type photocurable resin composition maintains a high glass transition temperature even when increasing a content ratio of the reactive monomer for securing adhesive strength with a polarizer, and durability at a high temperature is excellent. In one embodiment of the present specification, the solvent free-type photocurable resin composition has a glass transition temperature of higher than or equal to 80° C. and lower than or equal to 120° C., preferably higher than or equal to 85° C. and lower than or equal to 120° C., and more preferably higher than or equal to 90° C. and lower than or equal to 120° C. When the glass transition temperature of the solvent free-type photocurable resin composition satisfies the above-mentioned range, high temperature durability of a polarizing plate may be secured. Specifically, the solvent free-type photocurable resin composition according to one embodiment of the present specification comprises an isocyanate-based crosslinking agent and thereby forms a long polymer through crosslinking between a chain and a polarizer (PVA) when cured, and elasticity is high and durability at a high temperature is excellent with a high glass transition temperature.

In the present specification, the glass transition temperature may be measured using methods commonly used in the art. For example, a specimen is prepared by coating the acryl-based prepolymer or the solvent free-type photocurable resin composition between a release film (for example, polyethylene terephthalate film) to a thickness of 2 µm to 3 µm, curing the result by irradiating ultraviolet rays under a condition of light intensity being 1000 mJ/cm² or greater, then removing the release film. Then, 1 mg to 10 mg of this test sample is weighted in an open cell made of aluminum, a reversing heat flow (non-thermal component) behavior of the composition is obtained at a temperature raising rate of 10° C./min under the nitrogen atmosphere of 50 ml/min using a temperature modulating DSC. A temperature at a point where a straight line presents in an equidistant from a straight line extending a base line on a low temperature side and a straight line on a high temperature side of the reversing heat flow in a vertical axis direction crosses with a curve of a staircase shape changing part of a glass transition is employed as a glass transition temperature (Tg).

Polarizing Plate

Hereinafter, a polarizing plate of the present specification will be described.

One embodiment of the present specification provides a polarizing plate comprising a polarizer; and a protective layer provided on one surface or both surfaces of the polarizer, wherein the protective layer is a cured material of the solvent free-type photocurable resin composition for a polarizing plate protective layer described above. By directly providing a protective layer on one surface or both surfaces of a polarizer without a separate adhesive layer like an existing polarizing plate, the polarizing plate of the present specification has an advantage of preventing the polarizer from being torn by stress generated from polarizer shrinkage at a high temperature.

In one embodiment of the present specification, the polarizing plate comprises a polarizer; a protective layer provided on one surface of the polarizer; a protective film provided on the other surface of the polarizer; and an adhesive layer provided between the other surface of the polarizer and the protective film, wherein the protective layer may be a cured material of the solvent free-type photocurable resin composition for a polarizing plate protective layer described above.

In one embodiment of the present specification, the polarizing plate is a polarizing plate comprising a polarizer; and protective layers each provided on both surfaces of the polarizer, wherein the protective layer may be a cured material of the solvent free-type photocurable resin composition for a polarizing plate protective layer described above.

Polarizer

In the present specification, the "polarizer" means a state not comprising a protective layer (or protective film), and the "polarizing plate" means a state comprising a polarizer and a protective layer (or protective film).

In one embodiment of the present specification, as the polarizer, polarizers well known in the art, for example, polyvinyl alcohol-based films comprising iodine or a dichroic dye may be used. The polarizer may be prepared by dyeing a polyvinyl alcohol film with iodine or a dichroic dye, however, the preparation method thereof is not particularly limited.

In one embodiment of the present specification, the polyvinyl alcohol-based film is not particularly limited in the use as long as it comprises a polyvinyl alcohol resin or derivatives thereof. Herein, the derivative of the polyvinyl alcohol resin may comprise, but are not limited to, a polyvinyl formal resin, a polyvinyl acetal resin and the like. Alternatively, the polyvinyl alcohol-based film may use commercially available polyvinyl alcohol-based films generally used in polarizer preparations in the art such as P30, PE30 or PE60 of Kuraray Co. Ltd., and M2000, M3000 or M6000 of Nippon Gohsei Co., Ltd.

In one embodiment of the present specification, the polyvinyl alcohol-based film may have a degree of polymerization of greater than or equal to 1,000 and less than or equal to 10,000, and preferably greater than or equal to 1,500 and less than or equal to 5,000. This is due to the fact that molecular movements are free, and mixing with iodine, a dichroic dye or the like may be flexible when the degree of polymerization satisfies the above-mentioned range.

In one embodiment of the present specification, the polarizer may have a thickness of 12 μm to 40 μm, and preferably 12 μm to 25 μm. When the polarizer thickness is smaller than the above-mentioned range, optical properties may decline, and when the thickness is larger than the above-mentioned range, the degree of polarizer shrinkage at a low temperature (approximately −30° C.) increases causing a problem in heat-related durability of the polarizing plate.

Protective Film

In the present specification, the protective film is for supporting and protecting a polarizer, and protective films made of various materials generally known in the art such as cellulose-based films, polyethylene terephthalate (PET) films, cycloolefin polymer (COP) films or acryl-based films may be used without limit. Among these, using acryl-based films or polyethylene terephthalate films is particularly preferred considering optical properties, durability, economic feasibility and the like.

In one embodiment of the present specification, the acryl-based film may be obtained through molding a molding material comprising an acryl-based resin as a main component by extrusion molding. Herein, the acryl-based resin employs a resin comprising a (meth)acrylate-based unit as a main component, and is a concept comprising, as well as a homopolymer resin formed with a (meth)acrylate-based unit, a copolymer resin copolymerizing other monomer units in addition to the (meth)acrylate-based unit and a blend resin blending other resins to such a (meth)acrylate-based resin.

In the present specification, the (meth)acrylate-based unit may be, for example, an alkyl (meth)acrylate-based unit. Herein, the alkyl (meth)acrylate-based unit means both an alkyl acrylate unit and an alkyl methacrylate unit, and the alkyl group of the alkyl (meth)acrylate-based unit preferably has 1 to 10 carbon atoms, and more preferably has 1 to 4 carbon atoms.

In the present specification, examples of the monomer unit copolymerizable with the (meth)acrylate-based unit may comprise a styrene-based unit, a maleic anhydride-based unit, a maleimide-based unit and the like. Herein, examples of the styrene-based unit may comprise, but are not limited to, styrene, α-methylstyrene and the like; examples of the maleic anhydride-based monomer may comprise, but are not limited to, maleic anhydride, methyl maleic anhydride, ethyl maleic anhydride, propyl maleic anhydride, isopropyl maleic anhydride, cyclohexyl maleic anhydride, phenyl maleic anhydride and the like; and examples of the maleimide-based monomer may comprise, but are not limited to, maleimide, N-methyl maleimide, N-ethyl maleimide, N-propyl maleimide, N-isopropyl maleimide, N-cyclohexyl maleimide, N-phenyl maleimide and the like. These may be used either alone or as a mixture thereof.

In the present specification, the acryl-based resin may be an acryl-based resin having an aromatic ring, and examples of the acryl-based resin having an aromatic ring may comprise a resin composition described in Korean Patent Application Laid-Open Publication No. 10-2009-0115040.

In the present specification, the acryl-based resin may be an acryl-based resin having a lactone ring structure, and specific examples of the acryl-based resin having a lactone ring structure may comprise acryl-based resins having a lactone ring structure described in Japanese Patent Application Laid-Open Publication No. 2000-230016, Japanese Patent Application Laid-Open Publication No. 2001-151814, Japanese Patent Application Laid-Open Publication No. 2002-120326 and the like.

In the present specification, a method for preparing the acryl-based film is not particularly limited, and for example, the acryl-based film may be prepared by preparing a thermoplastic resin composition by sufficiently mixing an acryl-based resin, other polymers, additives and the like using any proper mixing method, and then film molding the result, or the acryl-based film may be prepared by preparing an acryl-based resin, other polymers, additives and the like as separate solutions, then forming a uniformly mixed solution by mixing the separately prepared solutions, and film molding the result. Examples of the film molding method may comprise any proper film molding method such as a solution casting method, a melting extrusion method, a calendar method and an extrusion molding method.

In the present specification, the acryl-based film may comprise a primer layer on one surface in order to provide a slip property and improve adhesive strength with a radical curable composition. Herein, the primer layer may be formed by coating a coating solution comprising a water-dispersible polymer resin, water-dispersible fine particles and water on an acryl-based film using a bar coating method, a gravure coating method and the like, and drying the result. Examples of the water-dispersible polymer resin may comprise water-dispersible polyurethane-based resins, water-dispersible acryl-based resins, water-dispersible polyester-based resins or combinations thereof, and as the water-dispersible fine particles, inorganic-based fine particles such as silica, titania, alumina or zirconia, organic-based fine particles formed with silicone-based resins, fluorine-based resins, (meth)acryl-based resins, crosslinked polyvinyl alcohol and melamine-based resins, or combinations thereof may be used, however, the examples are not limited thereto.

In the present specification, surface treatment may be carried out on the acryl-based film as necessary in order to enhance adhesive strength, and for example, at least one surface treatment selected from the group consisting of alkali treatment, corona treatment and plasma treatment may be carried out on at least one surface of the optical film.

In the present specification, attaching the polarizer and the protective film may be carried out using a method of coating an adhesive on a surface of the polarizer or the protective film using a roll coater, a gravure coater, a bar coater, a knife coater, a capillary coater or the like, and then heat laminating these using a laminating roll, laminating through room temperature pressing, or irradiating UV after lamination. Meanwhile, as the adhesive, various adhesives for a polarizing plate used in the art such as polyvinyl alcohol-based adhesives, polyurethane-based adhesives, acryl-based adhesives, cation-based or radical-based adhesives may be used without limit.

In one embodiment of the present specification, the protective film has a thickness of greater than or equal to 30 μm and less than or equal to 100 μm, and more preferably greater than or equal to 40 μm and less than or equal to 80 μm. When the thickness of the protective film is smaller than the above-mentioned range, cracks caused by thermal shock may occur since stress generated from polarizer shrinkage is transferred, and when the thickness is larger than the above-mentioned range, thinning of the polarizing plate may be difficult.

Protective Layer

In one embodiment of the present specification, the polarizing plate is a polarizing plate comprising a polarizer; and a protective layer provided on one surface or both surfaces of the polarizer, wherein the protective layer is a cured material of the solvent free-type photocurable resin composition for a polarizing plate protective layer (hereinafter, protective layer composition) described above.

In the present specification, the protective layer is for supporting and protecting the polarizer, and may be formed using methods well-known in the art.

In the present specification, the protective layer is formed using a method of coating the protective layer composition on one surface or both surfaces of the polarizer, and curing the result.

In one embodiment of the present specification, examples of the method of coating the protective layer composition may comprise a coating method using a coater. Examples of the coater may comprise a reverse roll coater, a forward roll coater, a gravure coater, a knife coater, a rod coater, a slot die coater, a slot orifice coater, a curtain coater, a fountain coater, an air doctor coater, a kiss coater, a dip coater, a bead coater, a blade coater, a cast coater, a spray coater, a spin coater, a bar coater, an extrusion coater, a hot melt coater and the like. The coater is preferably a reverse roll coater, a forward roll coater, a gravure coater, a rod coater, a slot die coater, a slot orifice coater, a curtain coater and a fountain coater. The coating method using the above-mentioned coater is preferred since a cured resin layer having a small thickness deviation, that is, a uniform thickness, may be obtained.

In one embodiment of the present specification, the method of curing the composition coated on one surface or both surfaces of the polarizer may comprise a method of irradiating ultraviolet rays.

In one embodiment of the present specification, a means of the ultraviolet irradiation may comprise a light source, an irradiator, a cooling device and a power supply.

In one embodiment of the present specification, examples of the ultraviolet light source may comprise a high-pressure mercury lamp, an ozoneless mercury lamp, a xenon lamp, a fusion lamp, a metal halide lamp and the like.

In one embodiment of the present specification, the ultraviolet rays have a wavelength range of greater than or equal to 100 nm and less than or equal to 400 nm, and preferably greater than or equal to 320 nm and less than or equal to 400 nm.

In one embodiment of the present specification, the irradiation light has light intensity of greater than or equal to 100 mJ/cm$^2$ and less than or equal to 1,000 mJ/cm$^2$, and preferably greater than or equal to 500 mJ/cm$^2$ and less than or equal to 1,000 mJ/cm$^2$. When the irradiation light has light intensity as above, the molecular weight and the conversion rate may be controlled in a target range.

In one embodiment of the present specification, the irradiation time of the irradiation light may be longer than or equal to 1 second and shorter than or equal to 10 minutes, and preferably longer than or equal to 2 seconds and shorter than or equal to 30 seconds. When the irradiation light has irradiation time as above, running wrinkles that may occur during a process of the polarizer may be minimized since less heat is received from a light source.

In one embodiment of the present specification, the protective layer has a thickness of greater than or equal to 4 μm and less than or equal to 11 μm, preferably greater than or equal to 5 μm and less than or equal to 10 μm, and more preferably greater than or equal to 6 μm and less than or equal to 8 μm. The thickness of the protective layer being smaller than the above-mentioned range may cause concern of decreasing hardness or high temperature durability of the protective layer, and the thickness being larger than the above-mentioned range is not proper in terms of thinning of the polarizing plate.

In one embodiment of the present specification, the protective layer has modulus of greater than or equal to 1,500 MPa and less than or equal to 3,000 MPa at room temperature (25° C.), and greater than or equal to 1,000 MPa and less than or equal to 2,500 MPa at a high temperature (80° C.). Preferably, the protective layer has modulus of greater than or equal to 2,000 MPa and less than or equal to 3,000 MPa at room temperature (25° C.), and greater than or equal to 1,500 MPa and less than or equal to 2,500 MPa at a high temperature (80° C.) The modulus of the protective layer may be measured in, after preparing a single protective layer having a thickness of greater than or equal to 30 μm and less than or equal to 50 μm, a multi-frequency-strain mode while raising a temperature from −30° C. to 160° C. under a condition of a temperature raising rate of 5° C./minute using a dynamic mechanical analysis (DMA).

Gluing Layer

In one embodiment of the present specification, the polarizing plate further comprises a gluing layer on the top of the protective layer. This is for attaching with a display device panel or an optical film such as a retardation film.

In one embodiment of the present specification, the gluing layer may be formed using various gluing agents well known in the art, and the type is not particularly limited. For example, the gluing layer may be formed using a rubber-based gluing agent, an acryl-based gluing agent, a silicone-based gluing agent, an urethane-based gluing agent, a polyvinyl alcohol-based gluing agent, a polyvinyl pyrrolidone-based gluing agent, a polyacrylamide-based gluing agent, a cellulose-based gluing agent, a vinylalkyl ether-based gluing agent and the like. Considering transparency, heat resistance and the like, using an acryl-based gluing agent is particularly preferred among these.

In one embodiment of the present specification, the gluing layer may be formed using a method of coating a gluing agent on the top of the protective layer, or may also be formed using a method of attaching a gluing sheet prepared by coating a gluing agent on a release sheet and then drying the result on the top of the protective layer.

Image Display Device

One embodiment of the present specification provides an image display device comprising the polarizing plate described above.

In one embodiment of the present specification, the polarizing plate may be useful in image display devices such as a liquid crystal display device.

In one embodiment of the present specification, the image display device comprises a liquid crystal panel; an upper polarizing plate provided on an upper surface of the liquid crystal panel; and a lower polarizing plate provided on a lower surface of the liquid crystal panel.

In one embodiment of the present specification, the upper polarizing plate is the polarizing plate described above.

In one embodiment of the present specification, the lower polarizing plate is the polarizing plate described above.

In one embodiment of the present specification, the upper polarizing plate and the lower polarizing plate are the polarizing plate described above.

In one embodiment of the present specification, types of the liquid crystal panel are not particularly limited. For example, known panels comprising passive matrix-type panels such as a twisted nematic (TN)-type, a super twisted nematic (STN)-type, a ferroelectric (F)-type or a polymer dispersed (PD)-type; active matrix-type panels such as a two terminal-type or a three terminal-type; in plane switching (IPS)-type panels and vertical alignment (VA)-type panels may all be used. In addition, types of other constitutions forming a liquid crystal display device such as upper and lower substrates (ex. color filter substrate or array substrate) are not particularly limited as well, and constitutions known in the art may be employed without limit.

Hereinafter, examples of the present disclosure will be described together with comparative examples. In addition, the following examples are for describing the present disclosure in more detail, and the scope of the present disclosure is not limited by the examples.

EXAMPLES

Preparation Example A: Preparation of Acryl-Based Prepolymer

To a reactor having nitrogen gas refluxed and equipped with a cooling device so as to readily control a temperature, parts by weight of iso-bornyl acrylate (IBOA) as a (meth) acrylate-based monomer; and 2 parts by weight of 4-hydroxybutyl acrylate as a crosslinkable monomer were introduced and partial polymerized to prepare an acryl-based prepolymer having viscosity of 400 cPs to 450 cPs, a weight average molecular weight of 300,000 to 360,000, and PDI of 3.

Preparation Example 1: Preparation of Solvent Free-Type Photocurable Resin Composition 1

Solvent Free-Type Photocurable Resin Composition 1 comprising the acryl-based prepolymer prepared in Preparation Example A; 20 parts by weight of 2-isocyanatoethyl acrylate based on 100 parts by weight of the acryl-based prepolymer as a crosslinking agent; and 3 parts by weight of IRG 819 based on 100 parts by weight of the prepolymer as a photoinitiator was prepared. Solvent Free-Type Photocurable Resin Composition 1 had viscosity of 130 cPs at 25° C.

Preparation Example 2: Preparation of Solvent Free-Type Photocurable Resin Composition 2

Solvent Free-Type Photocurable Resin Composition 2 was prepared in the same manner as in Preparation Example 1 except that the crosslinking agent content was 10 parts by weight based on 100 parts by weight of the acryl-based prepolymer. Solvent Free-Type Photocurable Resin Composition 2 had viscosity of 200 cPs at 25° C.

Preparation Example 3: Preparation of Solvent Free-Type Photocurable Resin Composition 3

Solvent Free-Type Photocurable Resin Composition 3 was prepared in the same manner as in Preparation Example 1 except that the crosslinking agent was not included. Solvent Free-Type Photocurable Resin Composition 3 had viscosity of 300 cPs or greater at 25° C.

Preparation Example 4: Preparation of Photocurable Resin Composition 4

A composition was prepared by mixing 98 parts by weight of iso-bornyl acrylate (IBOA); and 2 parts by weight of 4-hydroxybutyl acrylate. Photocurable Resin Composition 4 comprising, with respect to 100 parts by weight of this composition, 20 parts by weight of 2-isocyanatoethyl acrylate as a crosslinking agent; and 3 parts by weight of IRG 819 as a photoinitiator was prepared. In other words, a composition mixing an acrylate-based monomer in a monomer state that is not partially polymerized was prepared. Photocurable Resin Composition 4 had viscosity of 5.7 cPs at 25° C.

Preparation Example 5: Preparation of Photocurable Resin Composition 5

Photocurable Resin Composition 5 was prepared in the same manner as in Preparation Example 4 except that the crosslinking agent content was 10 parts by weight with respect to 100 parts by weight of the composition, and Photocurable Resin Composition 5 had viscosity of 6 cPs at 25° C.

Preparation Example 6: Preparation of Photocurable Resin Composition 6

Photocurable Resin Composition 6 was prepared in the same manner as in Preparation Example 4 except that the crosslinking agent was not further included, and Photocurable Resin Composition 6 had viscosity of 8 cPs at 25° C.

Preparation Example 7: Preparation of Photocurable Resin Composition 7

Photocurable Resin Composition 7 was prepared in the same manner as in Preparation Example 1 except that a hexamethylene diisocyanate (HDI) isocyanurate trimer (product name TUL-100) was used instead of 2-isocyanatoethyl acrylate as the crosslinking agent.

Preparation Example 8: Preparation of Photocurable Resin Composition 8

Photocurable Resin Composition 8 was prepared in the same manner as in Preparation Example 7 except that the crosslinking agent content was 10 parts by weight with respect to 100 parts by weight of the composition.

Preparation Example 9: Preparation of Photocurable Resin Composition 9

Photocurable Resin Composition 9 was prepared in the same manner as in Preparation Example 1 except that hexamethylene diisocyanate-based polyisocyanate (product name E402-100) was used instead of 2-isocyanatoethyl acrylate as the crosslinking agent.

Preparation Example 10: Preparation of Photocurable Resin Composition 10

Photocurable Resin Composition 10 was prepared in the same manner as in Preparation Example 9 except that the crosslinking agent content was 10 parts by weight with respect to 100 parts by weight of the composition.

Preparation Example 11: Preparation of Photocurable Resin Composition 11

Photocurable Resin Composition 11 was prepared in the same manner as in Preparation Example 1 except that a titanate coupling agent (product name KR-44), a titanium-based crosslinking agent, was used instead of 2-isocyanatoethyl acrylate as the crosslinking agent.

Preparation Example 12: Preparation of Photocurable Resin Composition 12

Photocurable Resin Composition 12 was prepared in the same manner as in Preparation Example 11 except that the crosslinking agent content was 10 parts by weight with respect to 100 parts by weight of the composition.

Compositions of Photocurable Resin Compositions 1 to 12 were compared, and the results are shown in the following Table 1 and Table 2.

TABLE 1

| | | Preparation Example 1 | Preparation Example 2 | Preparation Example 3 | Preparation Example 4 | Preparation Example 5 | Preparation Example 6 |
|---|---|---|---|---|---|---|---|
| | | Composition | | | | | |
| | | Solvent Free-Type Photocurable Resin Composition 1 | Solvent Free-Type Photocurable Resin Composition 2 | Solvent Free-Type Photocurable Resin Composition 3 | Photocurable Resin Composition 4 | Photocurable Resin Composition 5 | Photocurable Resin Composition 6 |
| Partial Polymerization | | ○ | ○ | ○ | X | X | X |
| Composition Ratio | IBOA | 98 | 98 | 98 | 98 | 98 | 98 |
| | 4-HBA | 2 | 2 | 2 | 2 | 2 | 2 |
| | AOI | 20 | 10 | 0 | 20 | 10 | 0 |
| | TUL-100 | 0 | 0 | 0 | 0 | 0 | 0 |
| | E402-100 | 0 | 0 | 0 | 0 | 0 | 0 |
| | KR-44 | 0 | 0 | 0 | 0 | 0 | 0 |
| | IRG819 | 3 | 3 | 3 | 3 | 3 | 3 |
| Viscosity (cPs)@25° C. | | 130 | 200 | Greater than 300 | 5.7 | 6 | 8 |

TABLE 2

| | | Preparation Example 7 | Preparation Example 8 | Preparation Example 9 | Preparation Example 10 | Preparation Example 11 | Preparation Example 12 |
|---|---|---|---|---|---|---|---|
| | | Composition | | | | | |
| | | Solvent Free-Type Photocurable Resin Composition 7 | Solvent Free-Type Photocurable Resin Composition 8 | Solvent Free-Type Photocurable Resin Composition 9 | Solvent Free-Type Photocurable Resin Composition 10 | Solvent Free-Type Photocurable Resin Composition 11 | Solvent Free-Type Photocurable Resin Composition 12 |
| Partial Polymerization | | ○ | ○ | ○ | ○ | ○ | ○ |
| Composition Ratio | IBOA | 98 | 98 | 98 | 98 | 98 | 98 |
| | 4-HBA | 2 | 2 | 2 | 2 | 2 | 2 |
| | AOI | 0 | 0 | 0 | 0 | 0 | 0 |
| | TUL-100 | 20 | 10 | 0 | 0 | 0 | 0 |
| | E402-100 | 0 | 0 | 20 | 10 | 0 | 0 |
| | KR-44 | 0 | 0 | 0 | 0 | 20 | 10 |
| | IRG819 | 3 | 3 | 3 | 3 | 3 | 3 |
| Viscosity (cPs)@25° C. | | Greater than 300 | Greater than 300 | Greater than 300 | Greater than 300 | 250 | 180 |

*IBOA: iso-bornyl acrylate
*4-HBA: 4-hydroxybutyl acrylate
*AOI: 2-isocyanatoethyl acrylate
*TUL-100: hexamethylene diisocyanate (HDI) isocyanurate trimer
*E402-100: hexamethylene diisocyanate-based polyisocyanate
*KR-44: titanate coupling agent
*IRG819: bis(2,4,6-trimethylbenzoyl)-phenyl phosphine oxide
*The composition ratio is based on 100 parts by weight of the acryl-based prepolymer Manufacture of Polarizing Plate

Example 1

A polarizer was prepared using a method of dyeing a polyvinyl alcohol (PVA)-based resin film with a dichroic dye, then elongating the result in a certain direction and crosslinking the result. On one surface of the prepared polarizer, a protective film was attached by the medium of an adhesive layer having a thickness of 2 μm to 3 μm. Specifically, an adhesive composition was coated on an opposite surface of the polarizer, then a protective film was laminated thereon, the result was heat laminated using a laminating roll, and then ultraviolet rays were irradiated to cure the adhesive composition. As the protective film, a PET film was used.

On a surface opposite to the protective film-provided surface of the polarizer, a protective layer having a thickness of 6 μm was formed. Specifically, the solvent free-type photocurable resin composition prepared in Preparation Example 1 was coated on a surface opposite to the protective film-provided surface of the polarizer using a bar coater or a roll coater, and by irradiating ultraviolet rays having a wavelength range of 320 nm to 400 nm for 2 seconds to 30 seconds with the intensity of 500 mJ/cm$^2$ to 1000 mJ/cm$^2$, the solvent free-type photocurable resin composition was cured to form a protective layer.

Example 2

A polarizing plate was manufactured in the same manner as in Example 1 except that Solvent Free-Type Photocurable Resin Composition 2 was used instead of Solvent Free-Type Photocurable Resin Composition 1, and the protective layer had a thickness of 8 μm.

Example 3

A polarizing plate was manufactured in the same manner as in Example 2 except that the coating layer had a thickness of 10 μm.

Comparative Example 1

A polarizing plate was manufactured in the same manner as in Example 1 except that Solvent Free-Type Photocurable Resin Composition 3 was used instead of Solvent Free-Type Photocurable Resin Composition 1.

Comparative Example 2

A polarizing plate was manufactured in the same manner as in Example 1 except that the protective layer had a thickness of 8 μm.

Comparative Example 3

A polarizing plate was manufactured in the same manner as in Example 1 except that the protective layer had a thickness of 10 μm.

Comparative Example 4

A composition was coated on a PVA polarizer in the same manner as in Example 1 except that Photocurable Resin Composition 4 was used instead of Solvent Free-Type Photocurable Resin Composition 1, however, viscosity was too low, and a coating layer was not formed.

Comparative Example 5

A composition was coated on a PVA polarizer in the same manner as in Example 1 except that Photocurable Resin Composition 5 was used instead of Solvent Free-Type Photocurable Resin Composition 1, however, viscosity was too low, and a coating layer was not formed.

Comparative Example 6

A polarizing plate was manufactured in the same manner as in Example 1 except that Photocurable Resin Composition 6 was used instead of Solvent Free-Type Photocurable Resin Composition 1.

Comparative Example 7

A polarizing plate was manufactured in the same manner as in Example 1 except that Solvent Free-Type Photocurable Resin Composition 7 was used instead of Solvent Free-Type Photocurable Resin Composition 1.

Comparative Example 8

A polarizing plate was manufactured in the same manner as in Example 1 except that Solvent Free-Type Photocurable Resin Composition 8 was used instead of Solvent Free-Type Photocurable Resin Composition 1.

Comparative Example 9

A polarizing plate was manufactured in the same manner as in Example 1 except that Solvent Free-Type Photocurable Resin Composition 9 was used instead of Solvent Free-Type Photocurable Resin Composition 1.

Comparative Example 10

A polarizing plate was manufactured in the same manner as in Example 1 except that Solvent Free-Type Photocurable Resin Composition 10 was used instead of Solvent Free-Type Photocurable Resin Composition 1.

Comparative Example 11

A polarizing plate was manufactured in the same manner as in Example 1 except that Solvent Free-Type Photocurable Resin Composition 11 was used instead of Solvent Free-Type Photocurable Resin Composition 1.

Comparative Example 12

A polarizing plate was manufactured in the same manner as in Example 1 except that Solvent Free-Type Photocurable Resin Composition 12 was used instead of Solvent Free-Type Photocurable Resin Composition 1.

EXPERIMENTAL EXAMPLES

Experimental Example 1: Evaluation on High Temperature Facilitation

Prior to coating the composition for forming a coating layer in the polarizing plate prepared in each of the examples and the comparative examples, cracks were induced by scraping at a right angle with respect to the elongation direction of the PVA film with a load of 500 g using a pencil with a blunt end. After that, a coating layer was formed using a bar coating method. After that, the laminate was introduced to a chamber with a temperature of 80° C., air atmosphere and humidity of 30% or less for 300 hours to 500 hours, and it was observed whether light leaked by the opening of cracks due to PVA shrinkage on the crack site of the polarizer. The number of cracks having light leakage among the total cracks (hereinafter, crack ratio) was calculated, and durability was evaluated by the following criteria after observing changes in the high temperature bright line. The results are shown in Table 3.

An experimental process of the evaluation on high temperature facilitation and the bright line image observed through an optical microscope are shown in FIG. 5.

<Criteria for Evaluation on High Temperature Facilitation>

○: crack ratio was less than 5%
Δ: crack ratio was greater than 20% and less than 30%
X: crack ratio was 95% or greater

TABLE 3

|  | Example 1 | Example 2 | Example 3 | Comparative Example 1 | Comparative Example 2 | Comparative Example 3 | Comparative Examples 4 to 6 | Comparative Examples 7 to 12 |
|---|---|---|---|---|---|---|---|---|
|  | Protective Layer Composition | | | | | | | |
|  | Composition 1 | Composition 2 | Composition 2 | Composition 3 | Composition 3 | Composition 3 | Compositions 4 to 6 | Compositions 7 to 12 |
| Protective Layer Thickness | 6 μm | 8 μm | 10 μm | 6 μm | 8 μm | 10 μm | 6 μm | 6 μm |
| Evaluation on High Temperature Facilitation | ○ (less than 3%) | Δ (28%) | Δ | X (100%) | X (100%) | X (100%) | Protective layer Not Formed | X (100%) |

Based on the results of Table 3, it was seen that Examples 1 to 3 using the composition having an acryl-based prepolymer partially polymerized and comprising an isocyanate-based crosslinking agent as a protective layer material had almost no or small crack ratio, whereas Comparative Examples 1 to 3 that did not comprise a crosslinking agent had a crack ratio of 100%, which indicated that durability very significantly decreased under a high temperature environment.

Meanwhile, in Comparative Examples 4 to 6 having an acryl-based monomer not partially polymerized, viscosity decreased and protective layer formation itself was impossible.

In addition, it was seen that, in Comparative Examples 7 to 12 that did not use AOI as a crosslinking agent, durability very significantly decreased under a high temperature environment.

In other words, it was seen that, when forming a protective layer using a composition having an acryl-based prepolymer partially polymerized and comprising an isocyanate-based crosslinking agent, polarizer shrinkage was effectively suppressed even under a high temperature environment, and light leakage was prevented.

Experimental Example 2: Evaluation on High Temperature Water Resistance

After leaving each of the polarizing plates manufactured in the examples and the comparative examples unattended for 24 hours in 60° C. water, decolorization of the polarizer and peel-off between the polarizer and the protective layer were evaluated, and the results are shown in the following Table 4.

An appearance image of each of the polarizing plates of Example 1 and Comparative Example 1 after the evaluation on high temperature water resistance is shown in FIG. 6.

Based on the results of Table 4, it was seen that, in Examples 1 to 3, decolorization of the polarizer did not occur, and the polarizer and the protective layer were not peeled off, whereas, in Comparative Examples 1 to 3, the polarizer and the protective layer were peeled off and decolorization of the polarizer was caused therefrom, and durability very significantly decreased under a high temperature and high humidity environment.

Meanwhile, in Comparative Examples 4 to 6 having an acryl-based monomer not partially polymerized, viscosity decreased and protective layer formation itself was impossible.

In addition, it was seen that, when an AOI crosslinking agent was not used as a crosslinking agent, problems of the polarizer and the protective layer being peeled off, and the polarizer being decolorized occurred.

In other words, it was seen that, in the examples using the solvent free-type photocurable resin composition and the crosslinking agent according to the present disclosure, the polarizer and the protective layer were not peeled off even under a high temperature and high humidity environment when forming a protective layer through direct coating on the polarizer, and decolorization of the polarizing element of the polarizer was prevented.

Experimental Example 3: Evaluation on Coatability

The protective layer composition of the present disclosure keeps viscosity in a certain range while being a solvent free-type, and thereby has advantages in that a separate solvent drying process is not required and coatability is excellent.

However, when the composition viscosity is too high, there is a problem in that coatability significantly decreases. Particularly, when preparing a solvent-type composition to a

TABLE 4

|  | Example 1 | Example 2 | Example 3 | Comparative Example 1 | Comparative Example 2 | Comparative Example 3 | Comparative Examples 4 to 6 | Comparative Examples 7 to 12 |
|---|---|---|---|---|---|---|---|---|
|  | Protective Layer Composition | | | | | | | |
|  | Composition 1 | Composition 2 | Composition 2 | Composition 3 | Composition 3 | Composition 3 | Compositions 4 to 6 | Compositions 7 to 12 |
| Protective Layer Thickness | 6 μm | 8 μm | 10 μm | 6 μm | 8 μm | 10 μm | 6 μm | 6 μm |
| Decolorization of Polarizer | X | X | X | ○ | ○ | ○ | Protective layer Not Formed | ○ |
| Peel-off between Polarizer and Protective layer | X | X | X | ○ | ○ | ○ | Protective layer Not Formed | ○ | solvent free-type, a powder or pellet state is obtained making coating on a substrate, a polarizer or the like difficult.

In order to identify this phenomenon, a solvent-type acryl-based polymer composition (product name: EX18-1293, manufacturer: Samyoung Ink&Paint Industrial Co., Ltd.) was prepared. The solvent-type composition had polymethyl methacrylate (PMMA) as a main component, used a toluene solvent as a solvent, had a solid content of 33%, had viscosity of 9,000 cPs at 25° C., and had a weight average molecular weight (Mw) of 150,000.

When preparing a composition having a solid content of 99% or higher by volatilizing the solvent of the solvent-type acryl-based polymer composition, it was identified that, as identified in FIG. 7, the composition changed to a pellet form, and coating on a polarizer and the like was very difficult.

The invention claimed is:

1. A solvent-free photocurable resin composition for a polarizing plate protective layer comprising:
   an acryl-based resin comprising (1) a first structure unit derived from a first acrylate-based monomer; (2) a second structure unit derived from a second acrylate-based monomer having hydroxyl crosslinking groups; and (3) unpolymerized monomers selected from a group consisting of the first acrylate-based monomer, the second acrylate-based monomer, and combinations thereof, thereby producing the acryl-based resin with a degree of partial polymerization, wherein the first structure unit and the second structure unit were partially co-polymerized, in the absence of a photoinitiator, the first structure unit being included in 98 parts by weight and the second structure unit being included in 2 parts by weight when the first structure unit and the second structure unit were partially co-polymerized; and
   an acrylate-based isocyanate crosslinking agent, wherein the acrylate-based isocyanate crosslinking agent is included in 10 parts by weight to 20 parts by weight with respect to 100 parts by weight of the acryl-based resin;
   wherein the degree of partial polymerization is selected such that the solvent-free photocurable resin composition has a viscosity at 25° C. of greater than or equal to 50 cPs and less than or equal to 300 cPs while having a solid content of 99.7% or higher;
   wherein the first structure unit is iso-bornyl acrylate (IBOA), the second structure unit is 4-hydroxylbutyl acrylate (4-HBA) and the acrylate-based isocyanate crosslinking agent is 2-isocyanatoethyl acrylate (AOI).

2. The solvent-free photocurable resin composition of claim 1, further comprising one or more additives selected from the group consisting of a dye, a pigment, an epoxy resin, an ultraviolet stabilizer, an antioxidant, a colorant, a reinforcing agent, a filler, a defoamer, a surfactant, a photoviscosity agent and a plasticizer.

3. The solvent-free photocurable resin composition of claim 1, wherein the acryl-based resin has a weight average molecular weight of greater than or equal to 300,000 and less than or equal to 2,000,000.

4. The solvent-free photocurable resin composition of claim 1, wherein the acryl-based resin has a degree of polymerization of greater than or equal to 5% and less than or equal to 20%.

5. The solvent-free photocurable resin composition of claim 1, wherein the acryl-based resin consists of the first structure unit, the second structure unit, the acrylate-based isocyanate crosslinking agent, the unpolymerized monomers and a photoinitiator.

6. An image display device comprising the polarizing plate of claim 1.

7. A polarizing plate comprising:
   a polarizer; and
   a protective layer provided on one surface or both surfaces of the polarizer,
   wherein the protective layer is a cured material of the solvent-free photocurable resin composition of claim 1.

8. The polarizing plate of claim 7, wherein the protective layer has a thickness of greater than or equal to 4 μm and less than or equal to 11 μm.

9. The polarizing plate of claim 7, wherein the protective layer is provided on each of both surf aces of the polarizer.

* * * * *